United States Patent
Chabod et al.

(10) Patent No.: US 11,849,833 B2
(45) Date of Patent: Dec. 26, 2023

(54) GEAR SLING DEVICE

(71) Applicant: ZEDEL, Crolles (FR)

(72) Inventors: Pierre-Olivier Chabod, Pontcharra (FR); Jules Tarrajat, Voiron (FR); Pierre Plaze, Cruet (FR)

(73) Assignee: ZEDEL, Crolles (FR)

( * ) Notice: Subject to any disclaimer, the term of this patent is extended or adjusted under 35 U.S.C. 154(b) by 0 days.

(21) Appl. No.: 17/361,062

(22) Filed: Jun. 28, 2021

(65) Prior Publication Data
US 2022/0007824 A1    Jan. 13, 2022

(30) Foreign Application Priority Data

Jul. 7, 2020 (FR) ..................... 2007188

(51) Int. Cl.
*F16B 45/02* (2006.01)
*A45F 5/02* (2006.01)
*F16M 13/04* (2006.01)

(52) U.S. Cl.
CPC ............ *A45F 5/021* (2013.01); *F16B 45/023* (2021.05); *F16M 13/04* (2013.01)

(58) Field of Classification Search
CPC ........... A63B 29/02; F16B 45/02; A45F 5/021
USPC ................... 224/671–672, 674–675
See application file for complete search history.

(56) References Cited

U.S. PATENT DOCUMENTS

| | | | |
|---|---|---|---|
| 7,082,647 B2 | 8/2006 | Maurice et al. | |
| 2005/0071961 A1 | 4/2005 | Maurice et al. | |
| 2009/0000086 A1 * | 1/2009 | Bing | F16B 45/06 24/592.11 |
| 2017/0095068 A1 * | 4/2017 | Moreau | B25H 3/04 |
| 2019/0166983 A1 * | 6/2019 | Moreland | A45F 5/021 |

FOREIGN PATENT DOCUMENTS

| | | | | |
|---|---|---|---|---|
| DE | 10 2010 023617 A1 | 12/2011 | | |
| EP | 1 522 748 A1 | 4/2005 | | |
| EP | 3 159 048 A1 | 4/2017 | | |
| EP | 3159048 A1 * | 4/2017 | ............ | A63B 29/02 |
| JP | 3213129 U | 10/2017 | | |

OTHER PUBLICATIONS

EP 3159048 Machine Translation. (Year: 2016).*
Monte, Johnston, "Winter Climbing Gear—Black Sheep Adventure Sports", Jul. 6, 2019, XP055789170, Extrait de Internet: URL:https://blacksheepadventuresports.com/2019/07/06/summer-or-2019-winter-climbinggear/(extrait le Mar. 23, 2021).

* cited by examiner

*Primary Examiner* — Adam J Waggenspack
(74) *Attorney, Agent, or Firm* — Oliff PLC

(57) ABSTRACT

A gear sling device comprises a body in the form of a hook with an opening and a gate fixed to the body. The gate is fitted movable with respect to the body between a first position closing the opening and a second position leaving the opening open. The body and gate define a ring. A loop is designed to fix the body to a belt of a harness or to a strap. The loop is partly bounded by the body. The gear sling device comprises a wire-like element fitted sliding inside a through hole passing through the body. The wire-like element extends from the through hole to a pressing area where a first end of the wire-like element pulls on the body. A clamp is configured to block the wire-like element and to define the size of the loop.

13 Claims, 3 Drawing Sheets

GEAR SLING DEVICE

BACKGROUND OF THE INVENTION

The invention relates to a gear sling device designed to be fixed to a belt of a harness or to a strap and a method for attaching a gear sling device to a harness belt or strap.

PRIOR ART

When performing rope-access work or mountaineering climbs, and in numerous activities at heights, it is common practice to carry a large amount of gear. Most harnesses are equipped with gear slings formed by textile loops which may also be reinforced by polymer elements.

However, it is advantageous to be able to add one or more additional gear slings so as to be able to carry additional gear or which present a configuration that is more suitable for certain types of equipment. The applicant markets gear slings of this kind presented in the documents US 2005/0071961 and EP 3159048. These gear slings come in the form of snap-hooks with a body defining a hook closed by a gate.

This results in the ergonomics of the connection between the gear sling and the belt of the harness being difficult to master. Document 2005/0071961 proposes integrating a guard lug in the inner volume of the snap-hook, the length of the lug and the width of the distance separating the lug from the body defining a belt volume that is accepted by the gear sling. When the belt is too bulky, installation is difficult. On the contrary, when the belt is too thin, the gear sling moves when gear is inserted or removed.

A similar problem exists for the gear sling presented in the document EP 3159048.

OBJECT OF THE INVENTION

One object of the invention consists in providing a gear sling device that adjusts better to match the different configurations of harness belts and straps and preferentially provides a better control of the holding force for the different volumes of harness belts and straps.

The gear sling device comprises:
a body in the form of a hook with an opening,
a gate fixed to the body, the gate being fitted movable with respect to the body between a first position closing the opening and a second position leaving the opening open, the body and gate defining a ring,
a loop designed to attach the body to a belt of a climbing harness or to a strap, the loop being partly bounded by the body.

The gear sling device is remarkable in that it comprises a wire-like element fitted sliding inside a through hole of the body, the wire-like element extending from the through hole up to a pressing area where a first end of the wire-like element pulls on the body,
a clamp configured to block the wire-like element and to define the size of the loop.

In one development, the body comprises a plurality of grooves, the wire-like element being secured in one of the plurality of grooves to define a height of the loop.

In advantageous manner, the wire-like element forms a loop, the first and second strands of the loop being separated by the body.

In a particular configuration, the wire-like element defines a terminal loop at the first end of the wire-like element, the terminal loop surrounding the body.

In an advantageous development, the loop is located outside the ring. As an alternative, the loop is located inside the ring.

It is also advantageous to provide for the clamp to be integrated in the body.

Preferentially, the clamp is a rotatably-mounted cam, the cam moving between a first position allowing sliding of the wire-like element and a second position blocking the wire-like element.

In another configuration, the clamp comprises a drilled part through which the wire-like element passes, the drilled part forming a deviation for the wire-like element and the drilled part moving inside the body between a first position allowing sliding of the wire-like element and a second position blocking the wire-like element, the deviation moving between the first position and the second position.

Is further advantageous to provide for the wire-like element to exit from the through hole via an outer wall of the body and to press on the inner wall of the body or for the wire-like element to exit from the through hole via an inner wall of the body and to press on the outer wall of the body.

It is a further object of the invention to provide a method for attaching a gear sling device to a belt of a harness or a strap enabling a better adjustment to the morphology of the harness belt or of the strap.

The method for attaching a gear sling device to a harness belt or strap comprises the following steps:
providing a gear sling device comprising a body in the form of a hook and a wire-like element fitted sliding on the body from a sliding area, the wire-like element being associated with a clamp configured to block the wire-like element,
installing the harness belt or strap against the body,
forming a loop around the harness belt or strap, the loop being formed partly by the body and partly by the wire-like element,
pulling on the wire-like element to tighten the loop and fix the harness belt or strap against the body.

BRIEF DESCRIPTION OF THE DRAWINGS

Other advantages and features will become more clearly apparent from the following description of particular embodiments and implementation modes of the invention given for non-restrictive example purposes only and represented in the appended drawings, in which.

DESCRIPTION OF THE EMBODIMENTS

Figure 1:
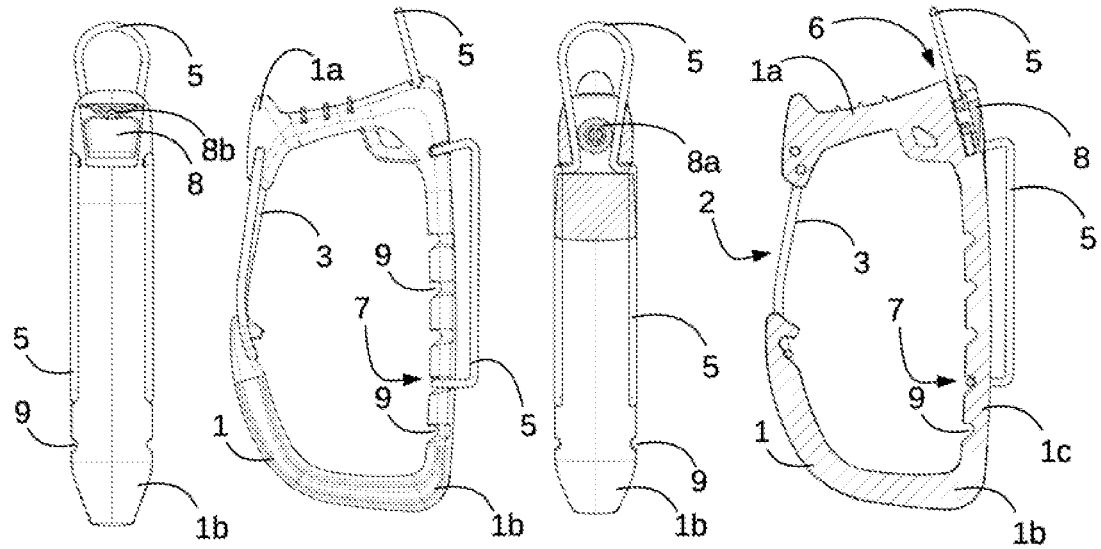
FIG. 1 illustrates in schematic manner different views of a first embodiment of a gear sling device, FIG. 1a illustrating a rear view, FIG. 1b illustrating a side view, FIG. 1c illustrating a transverse cross-sectional view at the level of the wire-like element clamp and FIG. 1d illustrating a longitudinal cross-sectional view.

The gear sling device comprises a body 1 in the form of a hook with an opening 2. The body 1 is designed to receive and support belaying equipment, climbing gear, or safety equipment. The body 1 can receive one or more ice screws, one or more snap-hooks, a mallet, one or more straps, and a perforating tool for example a chisel. The body 1 preferentially presents a C-shape with a top part 1a, a bottom part 1b and a link area 1c designed to join top part 1a and bottom part 1b.

The gear sling device comprises a gate 3 fixed to body 1. The gate 3 is fitted movable with respect to the body 1 between a first position closing the opening 2 and a second position leaving the opening 2 open. The body 1 and the gate 3 define a ring. The belaying equipment, climbing gear and safety equipment are installed in the ring and are kept secured in the ring by means of the gate 3 which closes the ring. Operation of the gate 3 is identical to that of a conventional snap-hook. Depending on the configurations, the gate 3 can be fixed to the top part or to the bottom part of the body 1.

A loop is designed to secure the body 1 to a belt of a harness or to a strap 4. The loop acts as attachment means between the gear sling device and the belt or strap 4. The loop is bounded partly by the body 1 and partly by a wire-like element 5.

The wire-like element 5 is fitted sliding inside a through the hole 6 of the body 1. The body 1 defines a through hole 6 and the wire-like element 5 is inserted in and slides inside the through hole 6. The wire-like element 5 extends from the through hole 6 to a pressing area 7 where a first end of the wire-like element 5 pulls on the body 1.

The wire-like element 5 has a first pressing point on the body 1 in the pressing area 7 and a second pressing point on body 1 by means of the through hole 6. When a tensile force is applied on the wire-like element 5, the latter is clamped, the pressing area 7 is imposed and the wire-like element 5 stretches to press the belt or strap 4 against the body 1. As an alternative, the pressing area 7 slides along the body 1 until it encounters the belt or strap 4. Once the pressing area 7 has been clamped, the force applied on the wire-like element 5 presses the belt or strap 4 against the body 1.

The gear sling device comprises a clamp 8 fixed to the body 1 and configured to clamp the wire-like element 5 and to define the size of the loop. The first pressing area 7 of the wire-like element 5 on the body 1 is movable, i.e. the distance between the pressing area 7 and the through hole 6 increases or decreases depending on the effective length of the wire-like element 5. The first end of the wire-like element 5 presses on the body 1 so that a tensile force applied on the wire-like element 5 beyond the through hole 6 reduces the opening of the loop which has the effect of pressing the belt or strap 4 against the body 1. The belt or strap 4 is arranged in the loop, i.e. between the body 1 and the wire-like element 5. The clamp 8 enables the tensile force applied on the wire-like element 5 to be maintained to maintain the mechanical strength between the body 1 and the belt or strap 4 in the absence of a force applied by the user.

In order to better master the stress applied by the wire-like element 5 on the belt or strap 4, it is advantageous for the wire-like element 5 to be formed by a static or semi-static wire-like element. What is meant by static or semi-static wire-like element is preferentially a wire-like element 5 presenting an elongation at rupture lower than or equal to 5%.

The wire-like element 5 can be a strap or a rope. It is preferable for the wire-like element 5 to be made from a textile material, but a metal the wire-like element is also possible.

The use of a wire-like element 5 fitted sliding in the body 1 and with a first end fixed to the body 1 while at the same time being movable enables the dimensions of the loop to be better adjusted to suit the dimensions of the belt or strap 4. Adjusting the effective length of the wire-like element 5 to the dimensions of the belt or strap 4 enables a better management of the force blocking the body 1 against the belt or strap 4 to be obtained.

The pressing area 7 of the first end of the wire-like element 5 on the body 1 can be achieved in different ways. It is possible to provide for the first end of the wire-like element 5 to have a terminal loop surrounding the body 1. The terminal loop can be formed by the wire-like element 5, for example by means of a knot. As an alternative, the terminal loop can be a loop made from another material. The terminal loop may also be achieved in the form of a hook. However, this configuration is less advantageous as the hook may become detached when the wire-like element 5 is not subjected to a sufficient tensile force.

It is also possible for the wire-like element 5 to be in the form of a loop with two strands that pass around the body 1 to achieve the pressing effect and apply the tensile force pressing the belt 4 against the body 1. This particular embodiment is illustrated in the different figures. This embodiment is preferred as it only uses the wire-like element 5 to press on the body 1.

When the wire-like element 5 has two strands, it is advantageous to prefer the embodiment in which the first and second strands of the loop are separated by the body 1 as illustrated in the different figures. By separating the two strands of the loop, the pressing force is better controlled. This also results in the mechanical connection between the body 1 and the belt or strap 4 being improved as the belt or strap 4 deforms to achieve a better coverage of the side walls of the body 1. This embodiment is particularly advantageous to secure straps or belts of small thickness.

In a particularly advantageous embodiment, the body 1 comprises a plurality of grooves 9. The grooves 9 are at different distances from the through hole 6. The grooves 9 extend over intermediate part 1c.

The wire-like element 5 is secured in a groove 9 of the plurality of grooves 9 to define a height of the loop. Installation of the wire-like element 5 in the groove 9 enables the pressing area 7 to be fixed. This embodiment is very advantageous as it enables the height of the loop to be defined independently from the height of the belt or strap 4 to be secured. This configuration prevents the belt or strap 4 from folding onto itself when the tensile force is applied on the wire-like element 5, which may be uncomfortable. The plurality of grooves 9 can be used for example with a wire-like element 5 in the form of a loop or terminated by a terminal loop or a hook.

In an alternative embodiment that is not illustrated, the grooves 9 are replaced by additional through holes in the body 1 and preferentially in an intermediate part 1c.

The first end of the wire-like element 5 passes through one of the additional through holes to define the height of the loop. A knot can be formed after the additional through hole to form the pressing area and withstand the tensile force. As an alternative, a hook can pass in the additional through hole and press on the body 1. The hook can be replaced by another salient part attached to the wire-like element. The terminal loop or the wire-like element in the form of a loop can pass around the body 1 to withstand the tensile force. It is also possible for the wire-like element 5 to pass through one of the additional through holes and to clip into a groove of the body to withstand the tensile force.

The grooves represent a preferred embodiment as it is simple to implement on the body and is also simple to use in particular when wearing gloves.

In the different configurations illustrated, the loop for fixing the belt or strap 4 to the body 1 is located outside the ring designed to receive the gear to be carried.

This configuration enables the usable internal volume of the hook defined by the body 1 to be increased while preventing the hook from being obstructed by the belt or strap 4. In this configuration, it is preferable for the wire-like element 5 to exit from the through hole 6 outside the ring to allow the wire-like element 5 to slide more easily thereby facilitating the clamping operation to secure the belt or strap 4 between the wire-like element 5 and the body 1. The pressure point is preferentially on the inner surface of the body 1.

However, in an alternative embodiment, the loop can be located in the ring. It is for example possible to modify the path of the wire-like element 5 exiting from the through hole 6 and to move pressure point 7 of the first end of the wire-like element 5 to be able to secure the belt or strap 4 in the ring.

Figures 5, 5A, 5B, 5C:
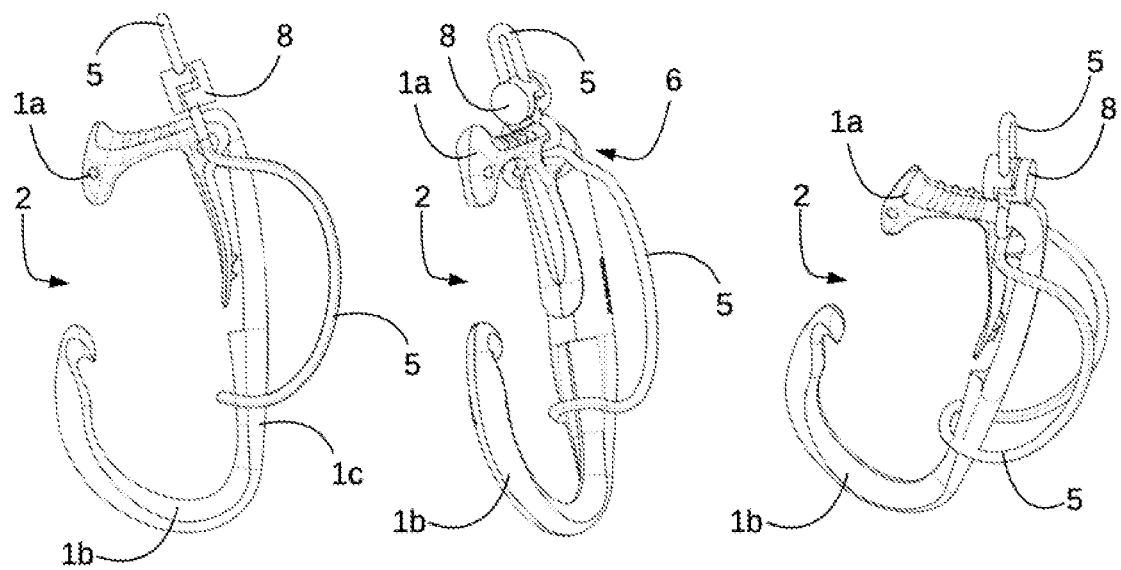
FIG. 5 illustrates in schematic manner different views of a fourth embodiment of a gear sling device, FIG. 5a illustrating a side view, FIG. 5b illustrating a perspective view, and FIG. 5c illustrating another perspective view.

Clamp 8 is configured to block the wire-like element 5 and to define the size of the loop. Depending on the configurations, clamp 8 is fixed to the body 1 or it is fitted independent from the body 1. FIGS. 1 to 4 illustrate a clamp 8 that is fixed to the body 1. FIG. 5 on the other hand illustrate an embodiment where clamp 8 is fitted away from the body 1 and presses on the body 1 to maintain the tensile force of the wire-like element 5.

Figure 2:
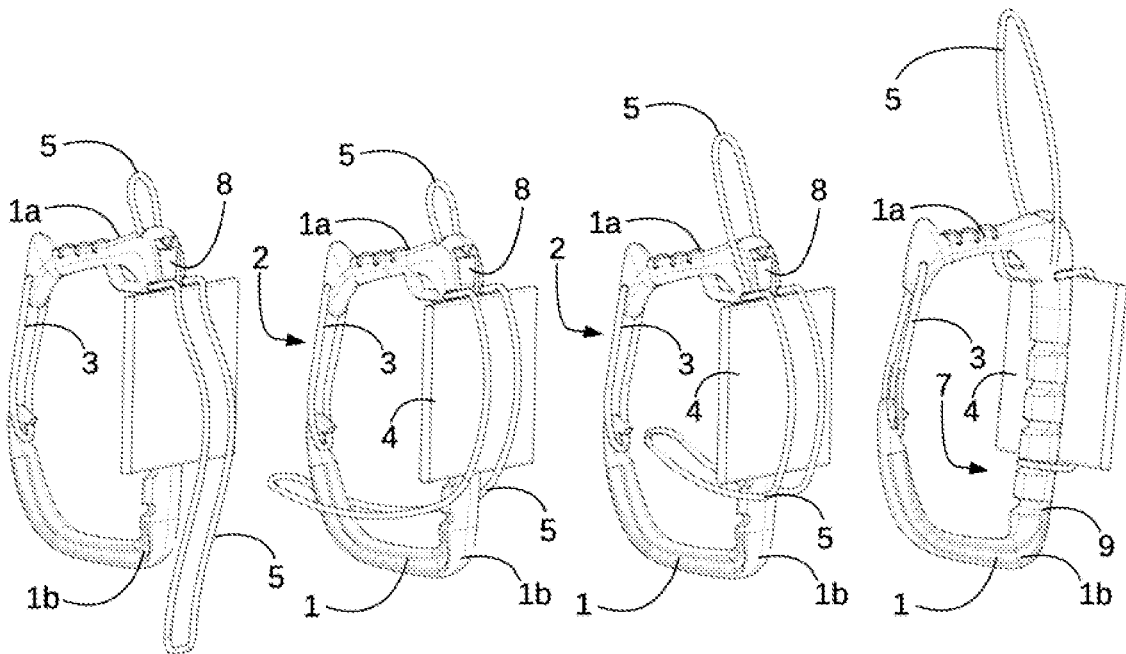
FIG. 2 illustrates in schematic manner different steps of fitting of a strap or belt in the attachment loop of a gear sling device according to the first embodiment, FIGS. 2a, 2b, 2c and 2d presenting four consecutive steps of fitting of a strap or belt in the gear sling.
Figure 3:
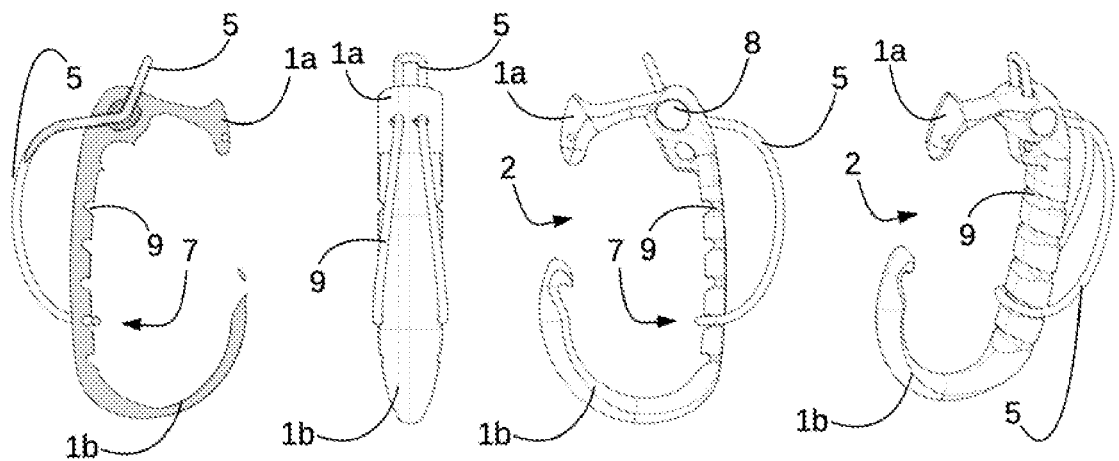
FIG. 3 illustrates in schematic manner different views of a second embodiment of a gear sling device, FIG. 3a illustrating a longitudinal cross-sectional view, FIG. 3b illustrating a rear view, FIG. 3c illustrating a side view, and FIG. 3d illustrating a perspective view.
Figure 4:
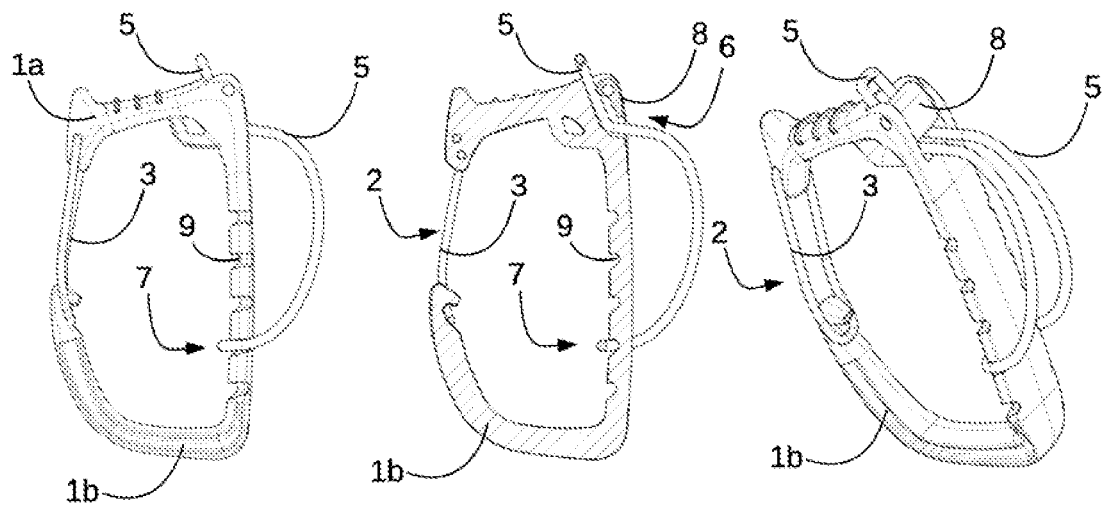
FIG. 4 illustrates in schematic manner different views of a third embodiment of a gear sling device, FIG. 4a illustrating a side view, FIG. 4b illustrating a longitudinal cross-sectional view, and FIG. 4c illustrating a perspective view.

In the embodiment illustrated in FIGS. 1, 2 and 3, clamp 8 is integrated in the body 1. The body 1 defines a hole and clamp 8 is installed in the hole. It is particularly advantageous for the clamp to be integrated in the through hole 6 defining the height of the loop.

In the embodiment illustrated in FIG. 1, the body defines a hole having a trapezoid shape. The two strands of the wire-like element 5 extend between the large base and the small base. A blocking part 8a is fitted movable between the large base and the small base. Blocking part 8a separates the two strands. Blocking part 8a is associated with a spring 8b that exerts a force moving the clamping part towards the small base. Spring 8b is configured to place the blocking part in a position where the two strands are wedged between the blocking part and the side walls of the body 1. In advantageous manner, the portion of strands directed towards the pressing area 7 exits via the small base of the trapezium. In this way, the tensile force applied on the wire-like element has the effect of moving the blocking part to its blocking position and of increasing the clamping force applied on the strands of the wire-like element. This configuration can also be applied to a wire-like element comprising a single strand only.

In the embodiment illustrated in FIGS. 3a, 3b, 3c and 3d, clamp 8 comprises a drilled part through which the wire-like element 5 passes. The drilled part forms a deviation for the wire-like element 5. What is meant by deviation is that the orientation of the longitudinal direction changes between one side of the drilled part and the other side of the drilled part. The deviation introduces a friction with the wire-like element 5. The drilled part is fitted movable in the hole. When the tensile force is applied on the wire-like element 5 to clamp the belt or strap, the drilled part moves in a first direction allowing the wire-like element 5 to slide. On the contrary, when the tensile force stops, the drilled part moves in a second direction opposite to the first direction and blocks the wire-like element 5. The deviation moves between the first position allowing sliding of the wire-like element and the second position blocking the wire-like element 5. It is also possible to provide for the drilled part to have an opening the cross-section of which varies in the transverse direction. The drilled part can move in the hole in one direction passing via the two opposite side faces, i.e. a direction perpendicular to the cutting plane illustrated in FIG. 3a. Movement of the drilled part can be between a first position allowing sliding and a second position performing blocking of the wire-like element.

In the embodiment illustrated in FIGS. 4a, 4b and 4c, clamp 8 is a rotatably-mounted cam, the cam moving between a first position allowing sliding of the wire-like element 5 and a second position blocking the wire-like element 5. The cam has a salient area arranged movable in rotation and that pinches the wire-like element 5 against the body 1 when the cam is in the second position.

In the embodiment illustrated in FIGS. 5a, 5b and 5c, the wire-like element 5 passes through the body 1 entering and exiting via the opposite side walls of the body 1. In the illustrated embodiment, the wire-like element is in the form of a loop and the two strands enter the through hole from the two opposite side walls and then exit to enter the clamp.

Clamp 8 presses on the top wall of the body 1 to maintain the tensile force on the wire-like element 5. Although this embodiment is illustrated without grooves or any other means enabling the height of the loop to be defined, it is possible to use the configurations described in the foregoing.

FIGS. 2a, 2b, 2c and 2d illustrate successive steps of fixing of the harness belt or strap 4 against the body of the gear sling device. As illustrated in FIG. 2a, the harness belt or strap 4 is placed against the body 1 or near to the body. The first end of the wire-like element 5 is free. In the illustrated configuration, the harness belt or strap 4 is placed against the outer wall of the body 1.

FIGS. 2b and 2c illustrate formation of a loop around the harness belt or strap 4 so as to secure the harness belt or strap 4 with the body 1. The loop around the harness belt or strap 4 is formed partly by the body 1 and partly by the wire-like element 5.

In the illustrated configuration, the wire-like element 5 is in the form of a loop that passes through the opening 2 pushing gate 3. In this way, the first end presses against the body 1 and forms the pressing area 7.

A tensile force is applied on the second end of the wire-like element to reduce the opening of the loop and press the harness belt or strap 4 against the body by means of the portion of the wire-like element located between the pressing area and the sliding area. In other words, a pull is exerted on the wire-like element 5 to tighten the loop and secure the harness belt or strap 4 against the body 1. Clamp 8 blocks the wire-like element 5 and keeps the harness belt or strap 4 in position.

In the illustrated configuration, the height of the loop is defined by choosing in which groove 9 the first end is blocked.

It is then possible to have a harness with a gear sling device that is more efficiently secured to the belt or to one of the straps of the harness. The harness is advantageously a harness for working at heights or for mountaineering, rock climbing, or caving.

The invention claimed is:

1. Gear sling device comprising:
   a body in the form of a hook with an opening,
   a gate fixed to the body, the gate being fitted movable with respect to the body between a first position closing the opening and a second position leaving the opening open, the body and gate defining a ring,
   a wire element fitted sliding inside a through hole of the body, the wire element extending from the through hole up to a pressing area where a first end of the wire element pulls on the body, wherein the body and the wire element each bounds a part of a loop designed to attach the body to a belt of a climbing harness or to a strap, the belt or the strap being disposed between the body and the wire element; and wherein the wire element is mounted slidingly with respect to the body to adjust the size of the loop, and
   a clamp configured to block the wire-like element and to define the size of the loop.

2. Gear sling device according to claim 1 wherein the body comprises a plurality of grooves, the wire element being secured in one of the plurality of grooves to define a height of the loop.

3. Gear sling device according to claim 1 wherein the wire element has first and second strands separated by the body.

4. Gear sling device according to claim 1 wherein the wire element further defines a terminal loop at the first end of the wire element, the terminal loop surrounding the body.

5. Gear sling device according to claim 1 wherein the loop is located outside the ring.

6. Gear sling device according to claim 1 wherein the loop is located inside the ring.

7. Gear sling device according to claim 1 wherein the clamp is integrated in the body.

8. Gear sling device according to claim 1 wherein the clamp is a cam mounted in rotation, the cam moving between a first position allowing sliding of the wire element and a second position blocking the wire element.

9. Gear sling device according to claim 1 wherein the clamp comprises a drilled part through which the wire element passes, the drilled part forming a deviation for the wire element and wherein the drilled part moves inside the body between a first position allowing sliding of the wire element and a second position blocking the wire element, the deviation moving between the first position and the second position.

10. Gear sling device according to claim 1 wherein the wire element exits from the through hole via an outer wall of the body and presses on the inner wall of the body or wherein the wire element exits from the through hole via an inner wall of the body and presses on the outer wall of the body.

11. Method for attaching a gear sling device to a harness belt or strap comprising the following steps:
    providing a gear sling device comprising a body in the form of a hook and a wire element wire element being associated with a clamp configured to block the wire element,
    installing the harness belt or strap against the body,
    forming a loop around the harness belt or strap, the loop being formed partly by the body and partly by the wire element,
    pulling on the wire element to adjust a site of the loop so as to tighten the loop and fix the harness belt or strap against the body, the wire element sliding in a sliding area of the body.

12. Gear sling device according to claim 1 wherein the wire element is chosen from a strap or a rope.

13. Gear sling device according to claim 1 wherein the wire element passes through the body.

* * * * *